Feb. 17, 1931.　　　J. KENT　　　1,793,426
COTTON PICKER
Filed Sept. 22, 1928　　2 Sheets-Sheet 1
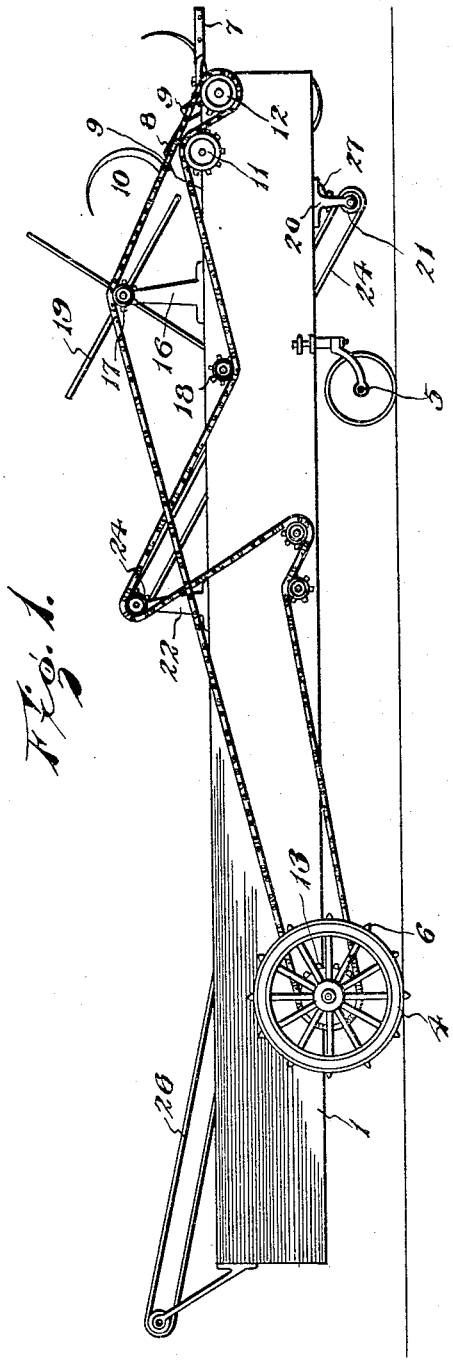
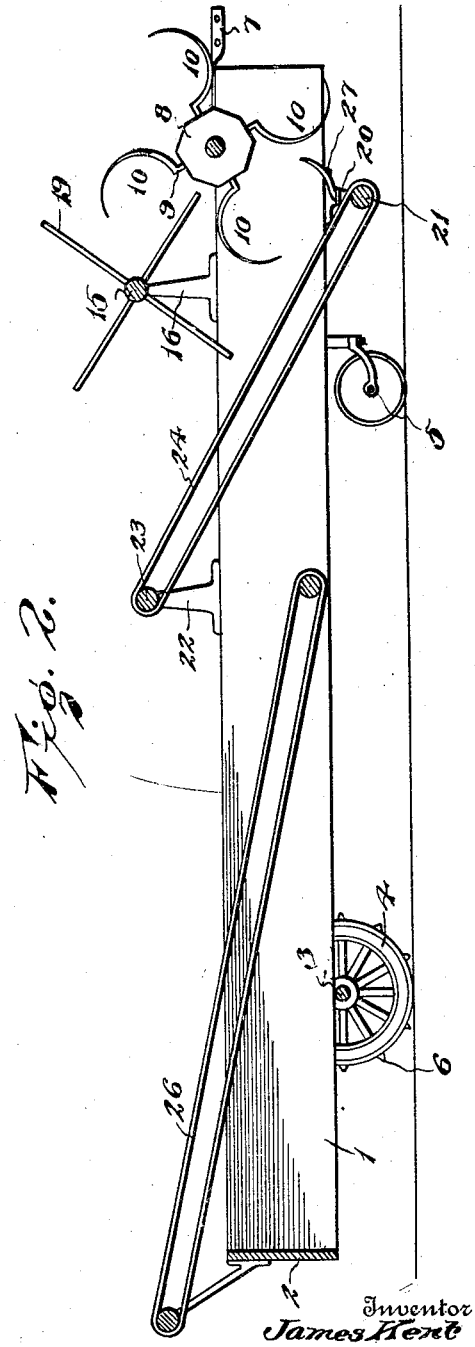
Inventor
James Kent Feb. 17, 1931. J. KENT 1,793,426
COTTON PICKER
Filed Sept. 22, 1928 2 Sheets-Sheet 2

Inventor
James Kent
By Lacey & Lacey, Attorneys

Patented Feb. 17, 1931

1,793,426

UNITED STATES PATENT OFFICE

JAMES KENT, OF WICHITA FALLS, TEXAS

COTTON PICKER

Application filed September 22, 1928. Serial No. 307,570.

This invention relates to cotton boll harvesters and has for its object the provision of a machine which may be easily drawn along a row of standing plants and which will operate to effectually strip the cotton bolls therefrom. The invention provides means whereby, as the machine is drawn along the row of plants, a plurality of fingers will be moved upwardly through the plants to strip the bolls therefrom and deliver them within the machine where they are acted upon by a revolving rake so that the stripping fingers will be cleared and the bolls then carried rearwardly and delivered into a suitable receptacle. The invention is illustrated in the accompanying drawings and will be hereinafter fully set forth.

In the drawings:

Figure 1 is a side elevation of a machine embodying the invention;

Fig. 2 is a longitudinal vertical section of the same, and

Figure 3:
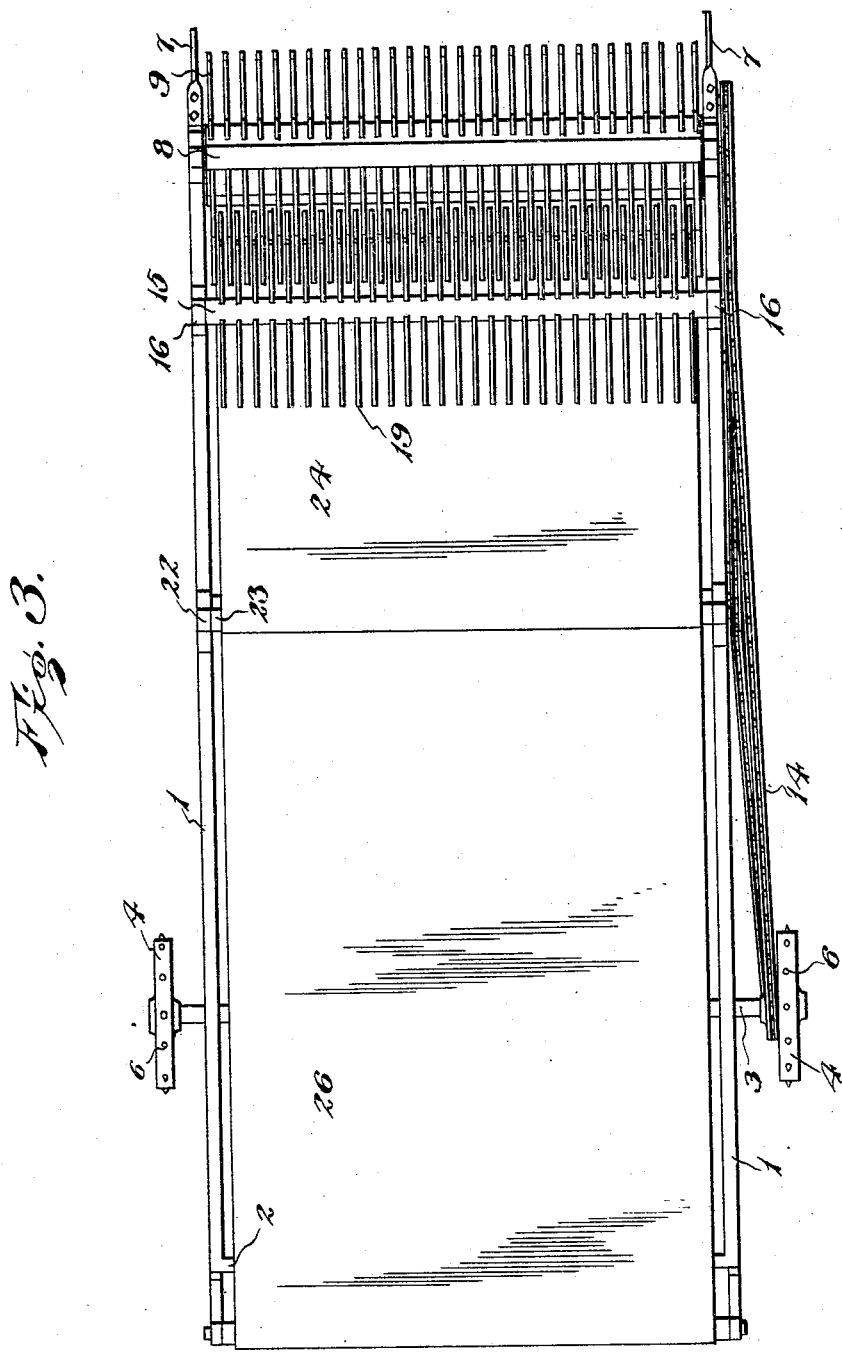
Fig. 3 is a plan view thereof.

In carrying out the invention, there is provided a frame consisting of sills or side bars 1 connected at their rear ends by a cross bar 2 and separated or open at their front ends. This frame is mounted upon a rear axle 3 carrying ground wheels 4, and upon casters 5 near its front end, the rear wheels being equipped with traction elements 6 whereby they will be positively rotated by the tractive engagement with the ground to drive the operating mechanism. The casters act in the well-known manner to cause the machine to follow the line of applied draft. At the front ends of the side bars are secured brackets or clevices 7 to which suitable draft devices may be attached in order that the machine may be drawn along the row of plants by a tractor or a team of draft animals.

Mounted in suitable bearings adjacent the front end of the frame is a roller or drum 8 which carries a plurality of series of stripping or gathering fingers 9 which at their inner ends project radially from the drum and have their outer free ends arcuate, as shown at 10, whereby they form baskets to retain the bolls stripped from the plants. The drum 8 may be mounted upon a shaft extending entirely through the same or may be provided with trunnions, and at the right hand side of the frame, the trunnion or shaft is extended to carry a sprocket gear 11 while an idler sprocket 12 is mounted upon the frame in advance of said sprocket 11. The rear axle 3 has secured thereon a driving sprocket 13 and a sprocket chain 14 is trained about said sprocket 13 and about the sprockets 11 and 12 so as to rotate the drum 8 in a direction contrary to the direction of rotation of the driving wheel. The several fingers 9 will, consequently, be caused to move upwardly through the successive plants and as they move upwardly they will strip from the stems all the bolls, the stems passing between the fingers so that they will not be broken from the stalks but will be left thereon. At the rear of the drum 8, a shaft 15 is mounted in suitable brackets 16 upon the frame and at the right hand end of this shaft is secured a sprocket 17 over which the chain 14 is trained, as shown in Fig. 1, and an idler sprocket 18 may be provided, as shown, to maintain the tension upon the chain and also keep the chain in proper operative mesh with the respective pinions, as well as reduce the liability of interference between the runs of the chain. The shaft 15 carries a plurality of radial teeth 19 which are so disposed as to alternate with the stripping fingers 9, and the shaft 15 is located above and at the rear of the drum 8 so that, as the teeth 19 move downwardly, they will pass through the spaces between the descending fingers 9 and any bolls or leaves which may be clinging to the stripping fingers will be raked therefrom. It is to be particularly noted that the rake revolves in a direction contrary to the direction of rotation of the stripper or puller and, in actual practice, moves twice as fast. This timing of the action is desirable as it causes two series of rake teeth to pass through or between each series of stripping or pulling fingers and promotes efficiency in the removal of the gathered bolls.

Disposed below the side bars 1 and carried by suitable bearings 20 thereon is a roller 21 and upon the upper edges of the side bars are brackets 22 carrying a second roller 23, an endless carrier belt or apron 24 being trained around said rollers 21 and 23 and so disposed as to receive the bolls from the teeth 19 and carry the same rearwardly. It will be understood that the teeth 19 act upon the bolls in such manner as to drive them downwardly and rearwardly onto the carrier or elevator, thereby minimizing the possibility of the bolls being dropped in front of the carrier and lost. The upper roller 23 has a sprocket 24 fixed upon its right hand end and the driving chain 14 is trained over said sprocket, as shown in Fig. 1, so that the same will be rotated and the elevating apron 24 driven in the proper direction, an idler 25 being provided to maintain the proper course of the drive chain. The elevating apron 24 delivers the bolls onto a second elevator 26 which carries the bolls over the back end of the frame and delivers them in a suitable receptacle supported at the outer end of the elevator or into a trailer connected with the frame so as to travel at the rear of the same.

Adjacent the lower front bight of the elevator 24 is a transverse series of fingers 27 which project upwardly and forwardly in alinement with the teeth 19 so that, as the fingers 9 continue their rotation, they will pass between adjacent fingers 27 and any bolls which possibly may have escaped the rake teeth will be stripped from the gathering fingers and directed onto the elevator.

The operation of the apparatus will, it is thought, be readily understood from what has been said. As the machine is drawn forward, the elevators, the rake and the stripping and gathering fingers will be positively driven and the series of stripping and gathering fingers 9 will move upwardly through the plants so as to pull the bolls from the stems, leaving the plants standing with the stalks and stems intact. As the rotation of the stripping fingers continues, the bolls taken up thereby will be carried over and rearwardly and will be discharged toward the elevator 24. The rake teeth 19 will impinge upon the bolls and strip them downwardly and rearwardly from the gathering fingers onto the elevator which will carry them off, as will be understood. Any leaves which may be pulled with the bolls by the stripping fingers will drop from the fingers as the fingers move downwardly at the rear of the drum 8 and the greater proportion of said leaves will find their way to the ground at the front of the fingers 27 but should the bolls and leaves tend to clog upon the stripping fingers, the rake teeth 19 will engage the same and positively remove them from the stripping fingers. If, perchance, the clearing of the fingers by the teeth 19 should not be complete, any remaining particles of cotton will be caught by the fingers 27 and diverted onto the elevator. It will be readily noted that the machine is very compact and is free of complicated constructions or arrangements of its parts and will, therefore, be of light draft and will not be apt to get out of order.

Having thus described the invention, 1 claim:

1. A cotton harvester comprising a portable frame, a plurality of stripping fingers rotatably mounted upon the frame adjacent the front end thereof, a rotating rake mounted upon the frame at the rear of the fingers and having teeth arranged to pass through the spaces between the fingers, a series of fingers mounted on the frame below the rake and the stripping fingers in advance of the axis of the rake and at the rear of the axis of the stripper fingers, and means for rotating the rake and the stripping fingers during travel of the frame.

2. A cotton harvester comprising a portable frame, a plurality of stripping fingers rotatably mounted upon the frame adjacent the front end thereof, a rotatable rake mounted upon the frame at the rear of the stripping fingers, an elevator disposed below and at the rear of the rake, a series of fingers disposed above and adjacent the lower front bight of the elevator and extending upwardly and forwardly, said fingers being arranged alternately with the stripping fingers whereby the stripping fingers will pass between the fingers, and means carried by the frame for driving the stripping fingers, the rake and the elevator.

3. A cotton harvester comprising a traveling frame, a plurality of stripping fingers rotatably mounted upon the frame adjacent the front end thereof, a rotatable rake mounted on the frame at the rear of the fingers and having its teeth arranged alternately with the fingers, an elevator disposed below and at the rear of the rake, a series of fingers mounted in the frame adjacent the lower front bight of the elevator and extending upwardly and forwardly toward the stripping fingers and in the planes of the respective rake teeth, and means carried by the frame for driving the stripping fingers, the rake and the elevator.

4. A cotton harvester comprising an open frame, ground wheels supporting the rear portion of the frame, a plurality of transverse series of stripping fingers rotatably mounted upon the frame adjacent the front end thereof, a rake rotatably mounted upon the frame at the rear of the stripping fingers and having teeth arranged alternately with the stripping fingers, an endless elevator mounted within the frame below and at the rear of the rake, a series of fingers mounted in the frame over adjacent the lower front bight of the elevator and projecting upwardly and forwardly toward the stripping fingers, driving sprockets on the corresponding ends of the upper rotatable support of the elevator, the rake and the carrier for the stripping fingers, a driving sprocket fixed to a ground wheel, and a driving chain trained about said several sprockets.

5. In a cotton harvester, an elevator, means for gathering the cotton, means for removing the cotton from said gathering means and depositing it on said elevator, and means at the lower end of said elevator cooperating with said gathering means to remove any residue therefrom and to prevent the cotton from dropping from said elevator.

In testimony whereof I affix my signature.

JAMES KENT. [L. S.]